United States Patent [19]

Itoh

[11] 4,015,425
[45] Apr. 5, 1977

[54] GAS TURBINE ENGINE FUEL CONTROL SYSTEM

[75] Inventor: Takane Itoh, Yokohama, Japan

[73] Assignee: Nissan Motor Co., Ltd., Yokohama, Japan

[22] Filed: July 9, 1974

[21] Appl. No.: 486,850

[30] Foreign Application Priority Data

July 10, 1973 Japan .............................. 48-77728

[52] U.S. Cl. ........................................ 60/39.28 T
[51] Int. Cl.² ...................................... F02C 9/08
[58] Field of Search ................... 60/39.28 T, 39.14

[56] References Cited

UNITED STATES PATENTS

| | | | |
|---|---|---|---|
| 3,291,146 | 12/1966 | Walker | 415/15 |
| 3,601,984 | 8/1971 | Davis | 60/39.14 X |
| 3,638,422 | 2/1972 | Loft | 60/39.28 R |
| 3,739,250 | 6/1973 | Beadman | 60/39.28 T |
| 3,793,826 | 2/1974 | Holleboom | 60/39.14 |

*Primary Examiner*—Clarence R. Gordon

[57] ABSTRACT

A calculator is interposed between a sequence controller and a fuel regulator in order that the fuel regulator injects an optimum quantity of fuel into a combustion chamber in dependence on the temperature of the engine at start, resulting in a gradual warming-up of the engine under all temperature conditions.

2 Claims, 1 Drawing Figure

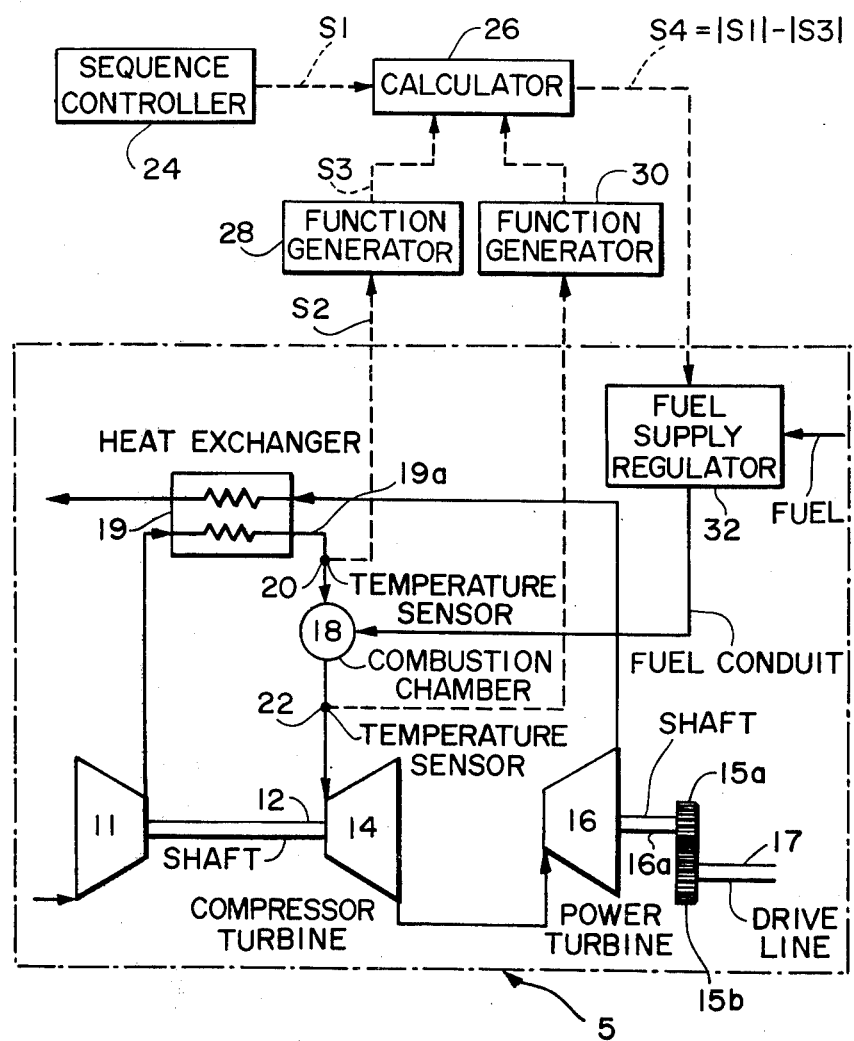

GAS TURBINE ENGINE FUEL CONTROL SYSTEM

This invention relates to a fuel feed control system of a gas turbine engine and more particularly to a fuel feed control system for injecting an optimum fuel quantity into a combustion chamber of a gas turbine engine in dependence on the engine temperature at start.

In a conventional gas turbine engine, control of the quantity of fuel injection to a combustion chamber from engine start to idling is carried out by a sequence controller. The sequence controller acts under a scheduled procedure on the assumption that the engine starts from cold. Therefore, when the engine is ignited under the condition that the temperature of the engine is appreciably higher than the assumed one, there is encountered a drawback as will be described below. That is, the number of the turbine revolutions per unit time abruptly increases with quick engine temperature rise because the energy otherwise employed to gradually rise the engine temperature is turned to rise the revolution number, resulting in thermal fatigue of the turbine blades for example.

According to the present invention, the aforementioned defect inherent to the prior art can be removed as follows: a fuel feed control system for a gas turbine engine having a compressor, a heat exchanger, a combustion chamber, a compressor turbine, a power turbine, a fuel supply regulator connected between the combustion chamber and a fuel tank, a sequence controller generating an electrical signal therefrom and controlling the fuel supply regulator in accordance with a preselected schedule is characterized by calculating means provided between the sequence controller and the fuel supply regulator, and controlling the electrical signal such that the fuel supply regulator supplies an optimum quantity of fuel for injection to the combustion chamber in dependence on the engine temperature at start.

It is therefore an object of the present invention to provide a gas turbine fuel supply control system that secures an optimum fuel quantity for injection to the combustion chamber according to the engine temperature at ignition.

This and other objects, features and advantages of this invention will be appreciated more readily by reference to the following detailed description considered in connection with the accompanying drawing wherein:

The FIGURE is a schematic diagram of a fuel supply control system embodying the present invention together with a conventional gas turbine engine.

Reference is now made to the Figure which illustrates schematically an improved control system in accordance with the present invention which is installed in a conventional gas turbine engine denoted by reference numeral 5. The gas turbine engine has a compressor 11 fixedly interconnected by a shaft 12 to a compressor turbine 14. A freely rotatable power output turbine 16 is fixedly mounted on a power output shaft 16a that is connected by a reduction gearing 15a and 15b to a drive line 17. A combustion chamber 18 receives compressed air discharged from the compressor 11 through a heat exchanger 19 and combines it with fuel supplied thereto from a fuel supply regulator 32, and upon ignition, discharges the products of combustion through the turbines 14 and 16 to drive a load in a known manner.

Further details of construction and operation of the engine per se are not described since they are known and believed to be unnecessary for understanding the invention.

The invention consists an improved fuel control system for providing an optimum quantity of fuel for injection in dependence on the engine temperature at start.

A sequence controller 24 is provided to control the fuel supply regulator 32 in order to permit the engine to warm up gradually in the case of cold starting, which is done by injecting an optimum fuel quantity into the combustion chamber. A control signal S1 from the sequence controller 24 is arranged to generate in such a manner as to control the fuel supply regulator 32 according to a preset schedule on the assumption that the engine starts from cold, therefore if the engine temperature is appreciably higher than the assumed one, there might occur an unwanted phenomenon such as thermal fatigue due to the turbine revolving excessively or excess temperature rise of the engine as mentioned above. In order to avoid this disadvantage, there is provided a calculator 26 between the sequence controller 24 and the regulator 32 to vary the fuel supply to the combustion chamber 18 in response to the engine temperature to ensure an optimum quantity of fuel injection under all temperature conditions.

A temperature sensor 20 is mounted on a compressed air discharge line 19a connecting the heat exchanger 19 and the combustion chamber 18 for sensing a temperature where the sensor 20 is located, and it supplies a function generator 28 with a signal S2 representing the temperature. It is to be noted that the sensor 20 is not restricted in its location to the above but it may be positioned in any suitable position such as in the vicinity of the combustion chamber 18 or a turbine stator (not shown) if only the sensor 20 senses accurately the temperature of the engine. Furthermore, to perceive more precisely the engine temperature, another sensor 22 might be mounted as shown in the drawing. In this case, another function generator 30 is added as shown which is interposed between the sensor 22 and the calculator 26 in the same manner as the function generator 28. The function generator 28 is connected to the temperature sensor 20 and receives the signal S2 representing the temperature where the sensor 20 is located. The function generator 28 is arranged to produce a signal S3 such that the signal is null if the engine temperature is equal to the assumed one mentioned in connection with the sequence controller 24 and increases with increase of the engine temperature. The signal S3 from the function generator 28 is fed to the calculator 26 connected thereto. The calculator 26 in turn generates a signal S4 the magnitude of which equals a difference between the absolute values of the signals S1 and S3. The signal S4 is then fed into the fuel supply regulator 32. Since the magnitude of the signal S4 decreases with increase of the engine temperature as previously described, it can reduce the quantity of fuel injection in response to the engine temperature rise after starting, so that a proper engine warming-up operation can be secured.

In the above embodiment of the present invention, the various signals are transmitted electrically or mechanically, and the function generator 28 can be arranged to cause the calculator 26 to increase the quantity of fuel injection when the engine is ignited at the temperature below the assumed one.

What is claimed is:

1. A gas turbine engine fuel feed control system, the turbine engine having a compressor, a heat exchanger, a combustion chamber, a compressor turbine, a power turbine, a fuel supply regulator connected between said combustion chamber and a fuel tank, a sequence controller generating a first electrical signal therefrom and controlling said fuel supply regulator in accordance with a preselected schedule, characterized in that calculating means is provided between said sequence controller and said fuel supply regulator, and controlling said first electrical signal such that said fuel supply regulator supplies an optimum quantity of fuel for injection to said combustion chamber at the time of ignition in dependence on the engine temperature as it exists just prior to the time of ignition.

2. A system as claimed in claim 1, further comprising at least one temperature sensor installed in said gas turbine engine for sensing its temperature, at least one function generator connected to said at least one temperature sensor and receiving at least one second electrical signal representing the temperature where said at least one sensor is located and adapted to supply at least one third electrical signal to said calculating means connected thereto, said calculating means calculating the difference between the absolute values of said at least one first and third electrical signals and feeding a fourth electrical signal representing said difference to said fuel supply regulator.

* * * * *